US012508558B2

(12) United States Patent
Pan

(10) Patent No.: US 12,508,558 B2
(45) Date of Patent: Dec. 30, 2025

(54) ROTATING MECHANISM OF HANDICRAFT

(71) Applicant: HUIZHOU DICHENG ELECTRONIC TECHNOLOGY CO., LTD, Huizhou (CN)

(72) Inventor: Binjie Pan, Huizhou (CN)

(73) Assignee: HUIZHOU DICHENG ELECTRONIC TECHNOLOGY CO., LTD, Huizhou (CN)

( * ) Notice: Subject to any disclaimer, the term of this patent is extended or adjusted under 35 U.S.C. 154(b) by 510 days.

(21) Appl. No.: 18/111,520

(22) Filed: Feb. 17, 2023

(65) Prior Publication Data

US 2024/0278198 A1 Aug. 22, 2024

(51) Int. Cl.
*B01F 33/453* (2022.01)
*B01F 27/07* (2022.01)
*B01F 27/113* (2022.01)

(52) U.S. Cl.
CPC ........ *B01F 33/4531* (2022.01); *B01F 27/071* (2022.01); *B01F 27/113* (2022.01); *B01F 33/4535* (2022.01)

(58) Field of Classification Search
CPC . B01F 27/113; B01F 33/4531; B01F 33/4535
USPC ......................................... 366/273, 274, 280
See application file for complete search history.

(56) References Cited

U.S. PATENT DOCUMENTS

| | | | | | |
|---|---|---|---|---|---|
| 721,973 | A * | 3/1903 | Smith | B01F 27/2324 366/328.2 |
| 5,758,965 | A * | 6/1998 | Gambrill | B01F 33/4534 366/331 |
| 6,282,820 | B1 * | 9/2001 | White | G09F 19/02 40/406 |
| 6,508,022 | B2 * | 1/2003 | Huang | G09F 19/08 40/406 |
| 7,065,908 | B1 * | 6/2006 | Pineda-Sanchez | G09F 19/02 40/406 |
| 2006/0092761 | A1 * | 5/2006 | Terentiev | C12M 23/14 366/314 |
| 2024/0198303 | A1 * | 6/2024 | Pan | B01F 27/113 |

* cited by examiner

*Primary Examiner* — David L Sorkin
(74) *Attorney, Agent, or Firm* — Leong C. Lei

(57) ABSTRACT

A rotating mechanism of a handicraft is provided, including: a cover body for covering a water lamp handicraft; a support member, where an end is connected to the cover body, and an other end includes an outer rotating groove; a water stirring impeller, located between the cover body and the support member, a rotating body, sleeved on the support member and having an inner rotating groove corresponding to the outer rotating groove; and a ball ring, located between the outer rotating groove and the inner rotating groove, where the rotating body is rotatably connected to the support member through the ball ring.

9 Claims, 6 Drawing Sheets

ROTATING MECHANISM OF HANDICRAFT

BACKGROUND

Technical Field

The present invention relates to the technical field of internal scene rotation of handicrafts, and in particular, to a rotating mechanism of a handicraft.

Related Art

At present, generally, a liquid is filled and decorations are added inside water lamp handicrafts on the market. In order to make the liquid inside show a flowing effect and drive the decorations to rotate, it is necessary to use a water stirring mechanism inside the handicrafts to stir the liquid to flow and drive the decorations to rotate, so as to increase the beauty and visual perception of the handicrafts.

An existing rotating mechanism generally adopts a bearing or non-bearing structure to drive decorations to rotate. When the bearing structure is adopted, through an external motor and the magnetic attraction principle, a water stirring impeller inside a handicraft is driven to rotate, and the water stirring impeller stirs the liquid to flow and drives a rotating platform connected to the bearing to rotate by using a liquid flowing force, causing the decorations mounted on the rotating platform to rotate. However, the rotating platform is not connected to the bearing stably enough and is easy to detach. Therefore, the rotating platform cannot rotate stably by using the bearing, causing the rotating platform fail to rotate. When the non-bearing structure is adopted, because the rotating platform and the decorations have certain weights, if the liquid flowing force is weak, the rotating platform cannot be driven to rotate, which affects a rotating effect of the decorations.

In view of this, with years of experience in research on handicrafts, the inventor comes up with an idea of designing a rotating mechanism ensuring a rotating effect of decorations, and after continuous trials and improvements, the present invention is thus proposed.

SUMMARY

An objective of the present invention is to provide a rotating mechanism of a handicraft ensuring a rotating effect of decorations.

To resolve the foregoing technical problems, the present invention adopts the following technical solutions, including:

- a cover body for covering a water lamp handicraft;
- a support member, where an end is connected to the cover body, and an other end includes an outer rotating groove;
- a water stirring impeller, located between the cover body and the support member;
- a rotating body, sleeved on the support member and having an inner rotating groove corresponding to the outer rotating groove; and
- a ball ring, located between the outer rotating groove and the inner rotating groove, where the rotating body is rotatably connected to the support member through the ball ring.

It should be noted that, the cover body closely covers the water lamp handicraft, and after being covered, the handicraft is filled with a liquid. Certainly, sequins, glitter, and the like may be added to the liquid. The support member, the water stirring impeller, the rotating body, the ball ring, and a fixed platform are all located inside the handicraft to drive the water stirring impeller to stir the liquid inside the handicraft by using a motor outside the cover body and using the magnetic attraction principle, and then drive the rotating body to rotate through the flowing liquid, so as to rotate the decorations mounted on the rotating body, thereby improving appreciation and visual perception of the water lamp handicraft.

In an embodiment, the rotating mechanism of a handicraft further includes a fixed platform, and the fixed platform is connected to the support member.

In an embodiment, a mounting column is arranged at a middle portion of the end of the support member including the outer rotating groove, the fixed platform includes a mounting groove, and the mounting column is inserted in the mounting groove and is locked by a locking member, enabling the fixed platform to be fixedly connected to the support member.

In an embodiment, an outer side of the rotating body has a rotating platform, and a plurality of blades is uniformly distributed on the rotating platform.

In an embodiment, the rotating platform includes a plurality of mounting holes, and modeling pieces of different patterns and styles may be connected through the mounting holes.

In an embodiment, a plurality of fixing columns is arranged on the cover body, the support member includes fixing grooves corresponding to the fixing columns, and the fixing columns are inserted into the fixing columns to enable the support member to be connected to the cover body.

In an embodiment, a connecting column is arranged on opposite surfaces of the cover body and the support member, both ends of the water stirring impeller include a connecting groove, and the connecting columns of the cover body and the support member are respectively inserted into the connecting grooves at the both ends of the water stirring impeller.

In an embodiment, the water stirring impeller includes a main body and an impeller sleeve, the main body has a magnetic member inside, the connecting grooves are located at both ends of the main body, and the impeller sleeve is sleeved on the main body.

In an embodiment, the connecting column is made of a soft rubber material.

BENEFICIAL EFFECTS

1. Ensured rotating effect. An end of the support member includes the outer rotating groove, the rotating body includes the inner rotating groove corresponding to the outer rotating groove, and the ball ring is arranged between the outer rotating groove and the inner rotating groove, enabling the rotating body to be rotatably connected to the support member stably. In addition, by using the ball ring, the rotating body can rotate more stably and smoothly, so as to improve rotating stability of the rotating body, thereby improving rotating stability of decorations and ensuring a rotating effect of the decorations.

2. Good appreciation effect. The rotating body is rotatably connected to the support member through the ball ring, and when the water stirring impeller drives the liquid inside the handicraft to flow, the rotating body rotates with the flowing liquid, enabling outer decorations mounted on the rotating body to rotate. In addition, inner decorations may further be mounted on the fixed platform connected to the support member. Eventually, an effect that the inner decorations are fixed and the outer decorations rotates is implemented, thereby increasing the appreciation effect.

DETAILED DESCRIPTION

To make the foregoing objectives, features, and advantages of the present invention more comprehensible, detailed description is made to specific implementations of the present invention below with reference to the accompanying drawings. In the following descriptions, many specific details are described for thorough understanding of the present invention. However, the present invention may be implemented in many other manners different from those described herein. A person skilled in the art may make similar improvements without departing from the connotation of the present invention. Therefore, the present invention is not limited to the specific embodiments disclosed below.

It should be noted that, when a component is referred to as "being fixed to" another component, the component may be directly on the other component, or an intervening component may be present. When a component is considered to be "connected to" another component, the component may be directly connected to the another component, or an intervening component may also be present. In contrast, when a component is referred to as being "directly on" or "directly connected to" another component, there is no intervening component. The terms "vertical", "horizontal", "left", and "right" and similar expressions used in this specification are merely used for the purpose of description.

Unless otherwise defined, meanings of all technical and scientific terms used in this specification are the same as those usually understood by a person skilled in the art to which the present invention belongs. In this specification, terms used in the specification of the present invention are merely intended to describe objectives of the specific implementations, but are not intended to limit the present invention. The term "and/or" used in this specification includes any and all combinations of one or more related listed items.

Figure 1:
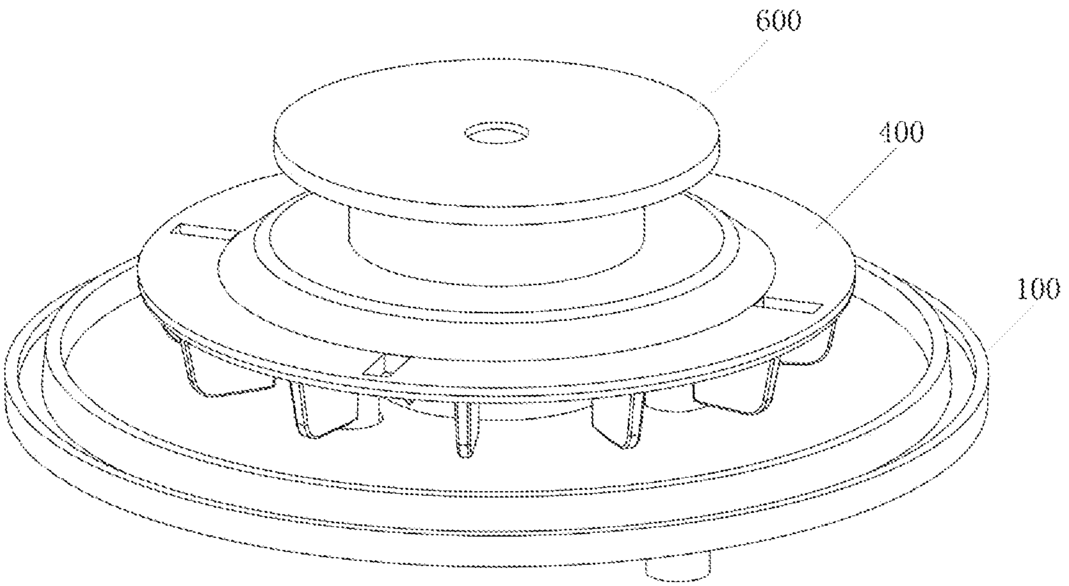
FIG. 1 is a schematic structural diagram of a rotating mechanism of a handicraft according to the present invention.
Figure 2:
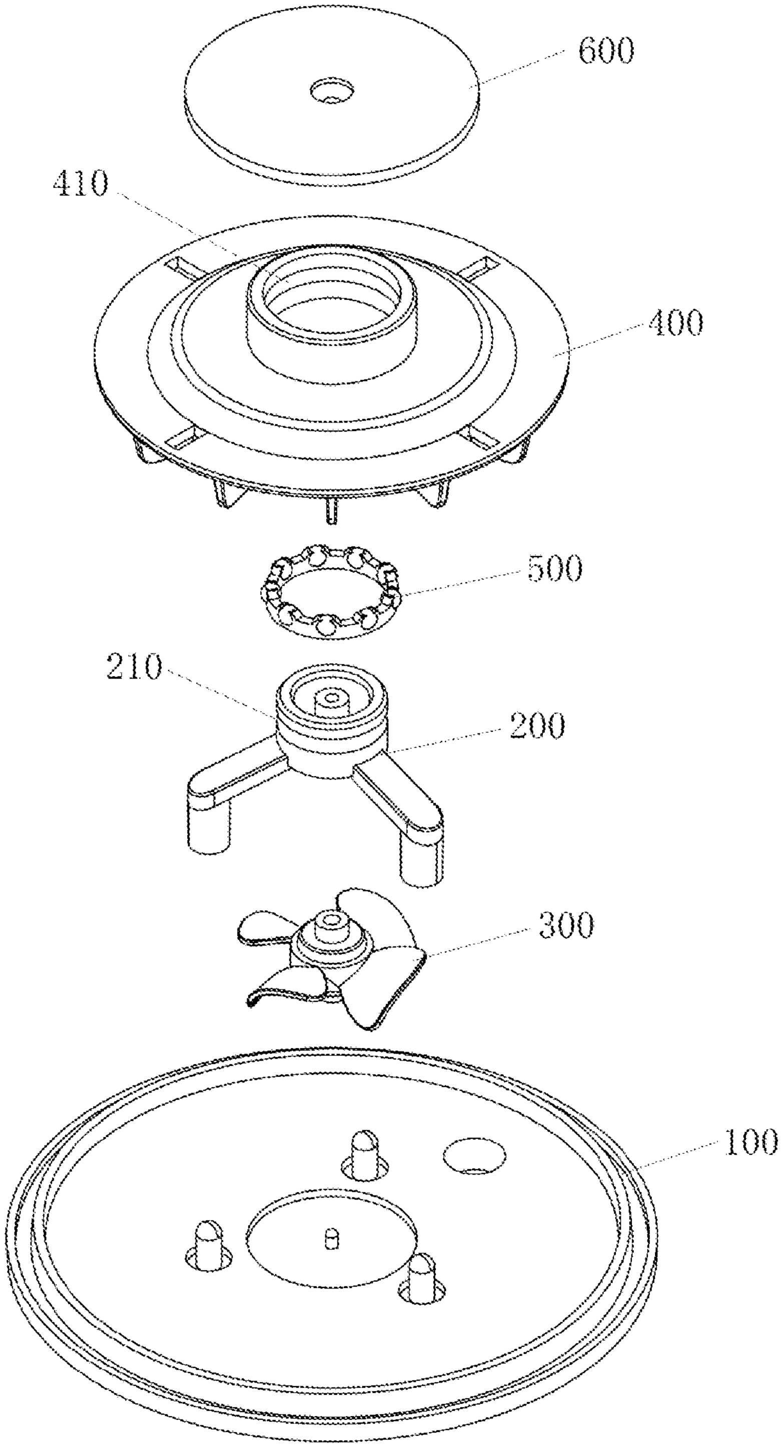
FIG. 2 is a schematic exploded view of a rotating mechanism of a handicraft according to the present invention.
Figure 3:
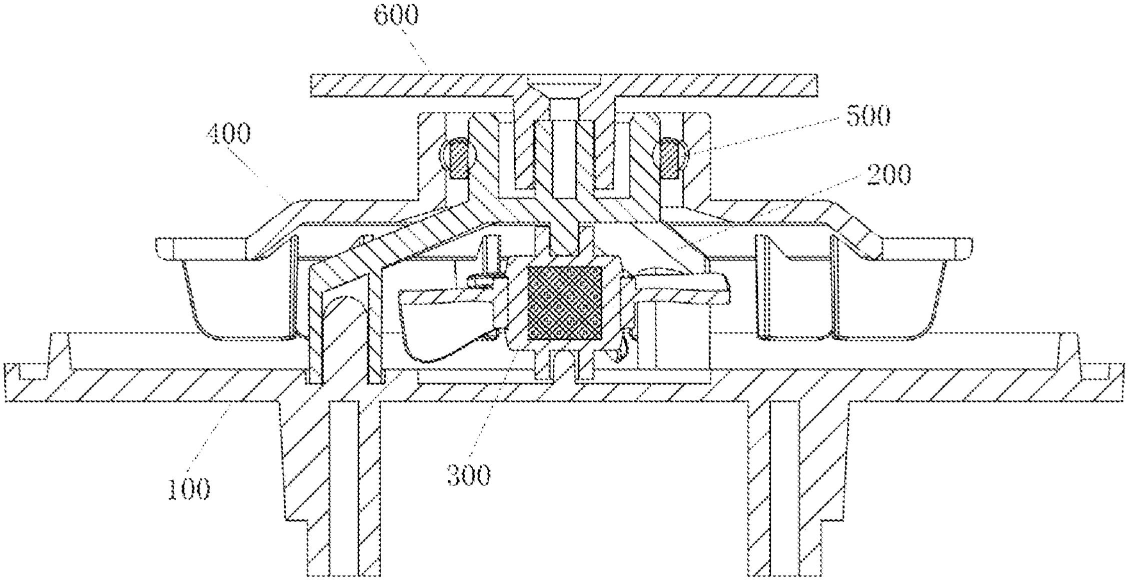
FIG. 3 is a sectional view of a rotating mechanism of a handicraft according to the present invention.

Referring to FIG. 1 to FIG. 3, a rotating mechanism of a handicraft is provided.

The rotating mechanism of a handicraft includes:

a cover body 100 for covering a water lamp handicraft;

a support member 200, where an end is connected to the cover body 100, and an other end includes an outer rotating groove 210;

a water stirring impeller 300, located between the cover body 100 and the support member 200;

a rotating body 400, sleeved on the support member 200 and having an inner rotating groove 410 corresponding to the outer rotating groove 210; and a ball ring 500, located between the outer rotating groove 210 and the inner rotating groove 410, where the rotating body 400 is rotatably connected to the support member 200 through the ball ring 500.

Specifically, in this embodiment, the cover body 100 closely covers the handicraft. After the cover body 100 covers the handicraft, the handicraft forms an airtight space, and the airtight space is filled with a liquid. Certainly, sequins, glitter, and the like may be added to the liquid. The support member 200, the water stirring impeller 300, the rotating body 400, and the ball ring 500 are all located in the airtight space. When the rotating mechanism is rotating, by using a motor outside the cover body 100 and using the magnetic attraction principle, the water stirring impeller 300 is driven to stir the liquid in the airtight space, causing the liquid to flow. When the liquid flows, a flowing force is generated, and by using the flowing force of the liquid, the rotating body 400 rotatably connected to the support member 200 is driven to rotate, thereby rotating the decorations mounted on the rotating body 400 to improve appreciation and visual perception of the water lamp handicraft.

In addition, an end of the support member 200 includes the outer rotating groove 210, the rotating body 400 includes the inner rotating groove 410 corresponding to the outer rotating groove 210, and the ball ring 500 is arranged between the outer rotating groove 210 and the inner rotating groove 410, so as to limit the ball ring 500 and enable the rotating body 400 to be rotatably connected to the support member 200 stably. In addition, by using the ball ring 500, a friction force when the rotating body 400 rotates may be reduced, so that the rotating body 400 can rotate more stably and smoothly, so as to improve rotating stability of the rotating body 400, thereby improving rotating stability of decorations and ensuring a rotating effect of the decorations.

Certainly, the rotating mechanism of a handicraft further includes a fixed platform 600, and the fixed platform 600 is also located in an airtight space and connected to the support member 200. The fixed platform 600 is fixedly connected to the support member 200. Therefore, the fixed platform 600 is in a fixed state and is not rotatable, inner decorations may be mounted on the fixed platform 600, and outer decorations may be mounted on the rotating body 400. The inner decorations are fixed and the outer decorations rotate, providing a better appreciation effect of the water lamp handicraft, and bringing consumers more unique visual perception.

Figure 4:
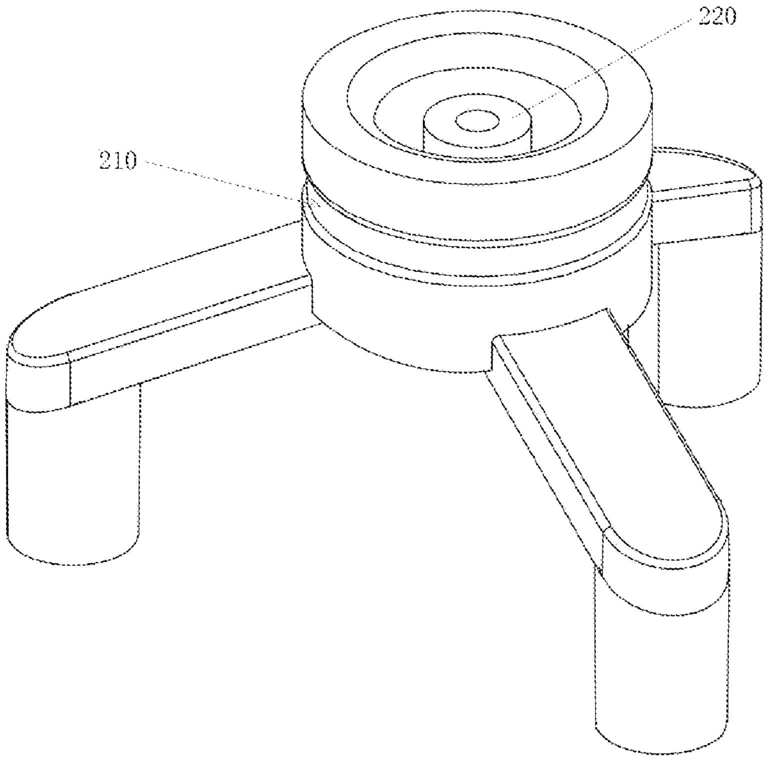
FIG. 4 is a schematic structural diagram 1 of a support member of a rotating mechanism of a handicraft according to the present invention.
Figure 7:
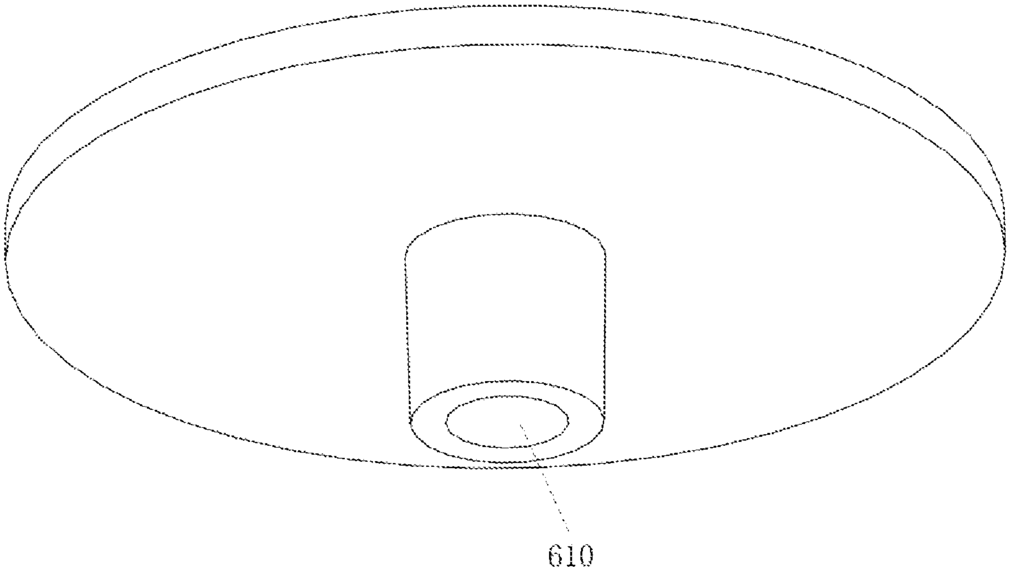
FIG. 7 is a schematic structural diagram of a fixed platform of a rotating mechanism of a handicraft according to the present invention.

Referring to FIG. 4 and FIG. 7, to implement fixed connection between the fixed platform and the support member and fix the inner decorations on the fixed platform 600, a mounting column 220 is arranged on the support member 200. In addition, the fixed platform 600 includes a mounting groove 610, and the mounting column 220 of the support member 200 is inserted into the mounting groove 610 of the fixed platform 600 and is locked by a locking member (not shown), which is a screw, so that the fixed platform 600 can be fixedly connected to the support member 200 tightly. Therefore, when the liquid flows, only the rotating body 400 is driven to rotate and the fixed platform 600 keeps still. Eventually, an appreciation effect of the water lamp handicraft that the outer decorations rotate and the inner decorations are fixed is presented.

Figure 6:
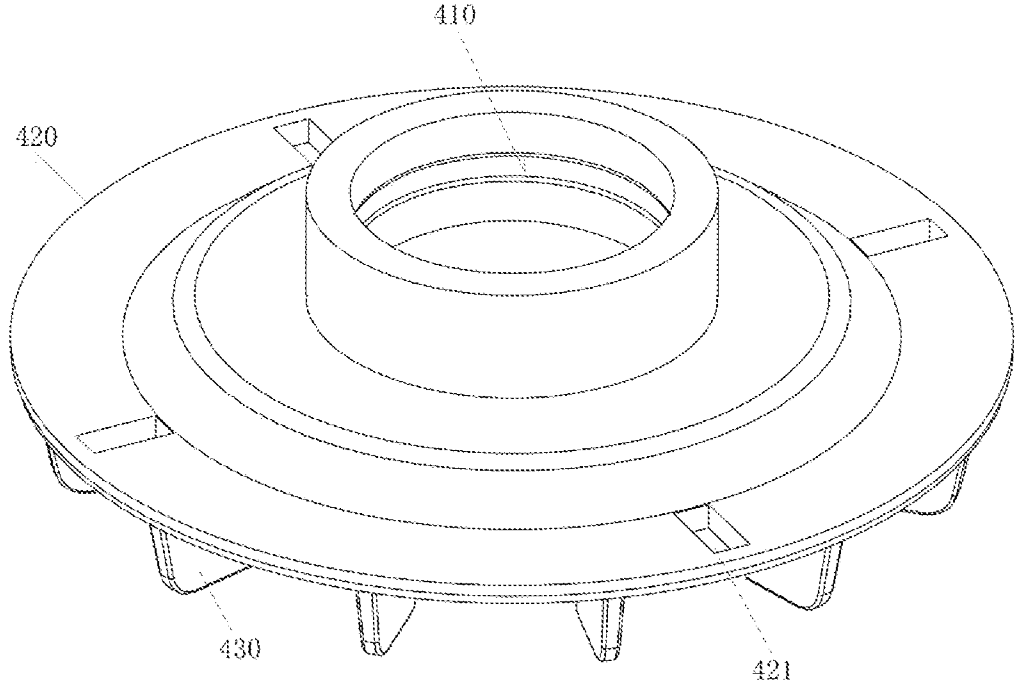
FIG. 6 is a schematic structural diagram of a rotating body of a rotating mechanism of a handicraft according to the present invention.

Referring to FIG. 6, because the outer decorations need to be arranged on the rotating body 400 and rotate, an outer side of the rotating body 400 further has a rotating platform 420, and the rotating platform 420 includes a mounting hole 421. The outer decorations (modeling pieces) may be assembled on the rotating platform 420 through the mounting hole 421, and the outer decorations (modeling pieces) may be modeling pieces of different patterns and styles. In addition, a plurality of blades 430 is uniformly distributed on the rotating platform 420, and when the water stirring impeller 300 stirs the liquid to flow, the flowing liquid drives the blades 430 of the rotating platform 420 to rotate, so as to rotate the rotating body 400, thereby rotating the outer decorations mounted on the rotating body 400.

In addition, when rotating, the rotating body 400 rolls between the outer rotating groove 210 and the inner rotating groove 410 by using the ball ring 500 to reduce a friction force and improve a rotating effect of the rotating body 400, enabling smooth and stable rotation. Eventually, a rotating effect of the outer decorations is ensured.

Figure 5:
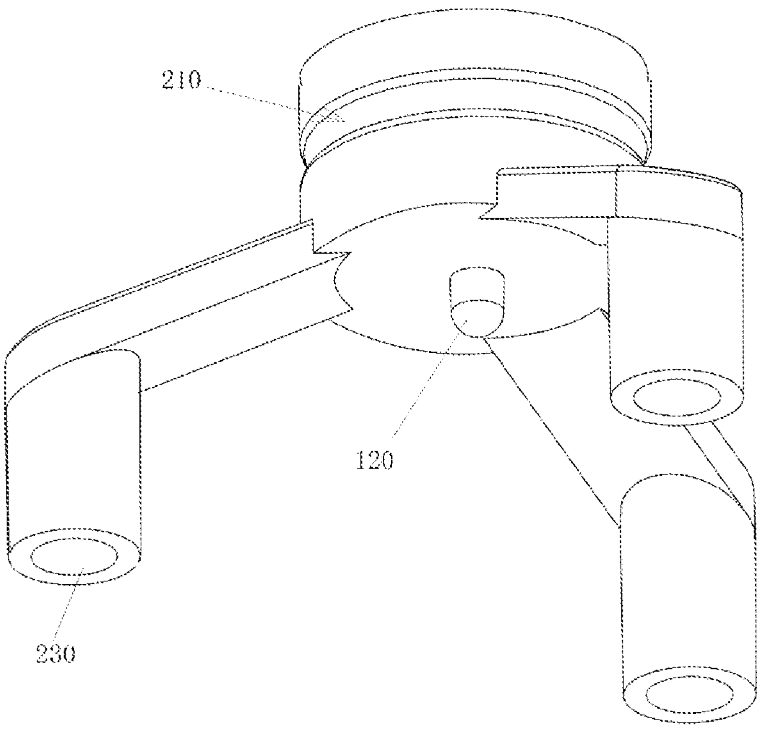
FIG. 5 is a schematic structural diagram 2 of a support member of a rotating mechanism of a handicraft according to the present invention.
Figure 8:
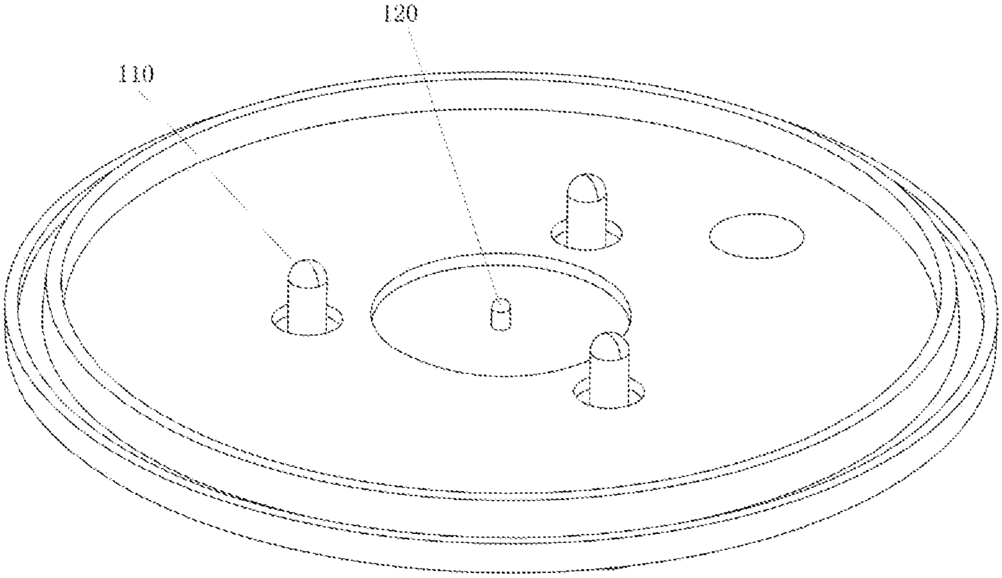
FIG. 8 is a schematic structural diagram of a cover body of a rotating mechanism of a handicraft according to the present invention.

Referring to FIG. 5 and FIG. 8, for ease of assembling the support member 200 and the cover body 100, a plurality of fixing columns 110 is arranged on the cover body 100, and an other end of the support member 200 includes fixing grooves 230 corresponding to the fixing columns 110. During assembly of the support member 200 and the cover body 100, the fixing columns 110 are directly inserted into the fixing grooves 230 to implement connection between the support member 200 and the cover body 100, enabling easy assembly.

Figure 9:
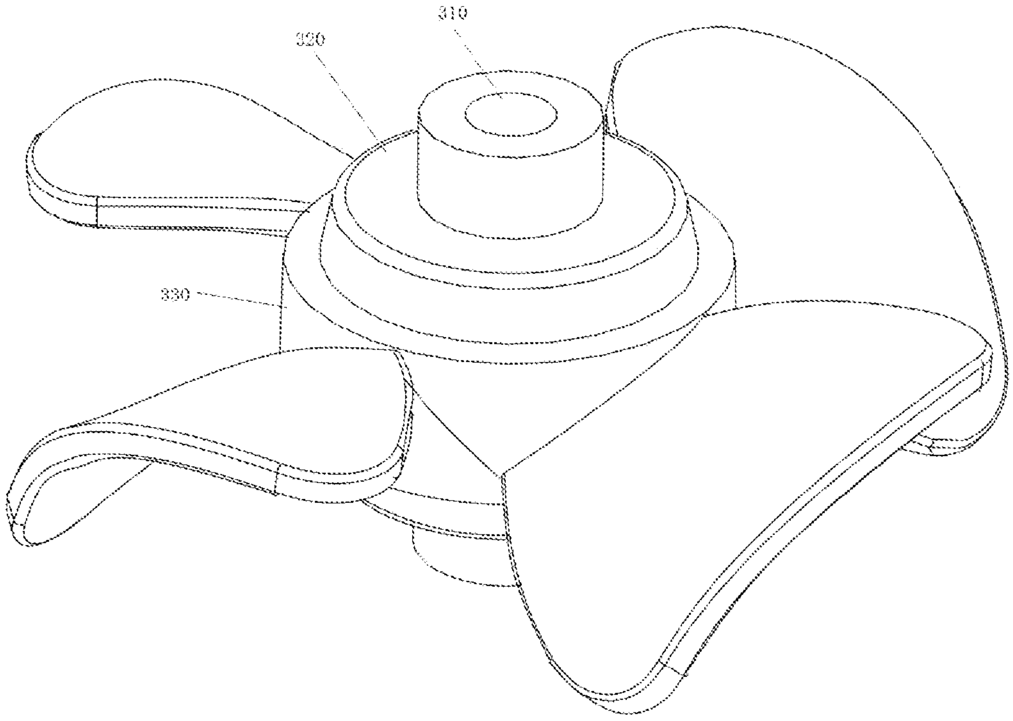
FIG. 9 is a schematic structural diagram of a water stirring impeller of a rotating mechanism of a handicraft according to the present invention.

Referring FIG. 5, FIG. 8, and FIG. 9, in this embodiment, to ensure a rotating driving effect and stability of the water stirring impeller 300, a connecting column 120 is arranged on opposite surfaces of the cover body 100 and the support member 200, and both ends of the water stirring impeller 300 include a connecting groove 310. Certainly, alternatively, a connecting column 120 may be arranged at both ends of the water stirring impeller 300, and opposite surfaces of the cover body 100 and the support member 200 both include a connecting groove 310. Alternatively, a connecting column 120 may be arranged at an end of the water stirring impeller 300, an other end includes a connecting groove 310, and correspondingly, opposite surfaces of the cover body 100 and the support member 200 include a connecting column 120 or a connecting groove 310. During assembling of the water stirring impeller 300, the connecting columns 120 of the cover body 100 and the support member 200 are separately inserted into the connecting grooves 310 at both ends of the water stirring impeller 300, to implement the assembly of the water stirring impeller 300 and limit the water stirring impeller 300, avoiding displacement during rotation, thereby improving the rotating driving effect of the water stirring impeller 300 and ensuring stability of the water stirring impeller 300.

In addition, the water stirring impeller 300 needs to rotate, and noise is produced during the rotation. To reduce the noise, the connecting column 120 is made of a soft rubber material, so that connection between the water stirring impeller 300 and the cover body 100 and connection between the water stirring impeller 300 and the support member 200 are soft connection, so as to effectively reduce the noise during the rotation of the water stirring impeller 300 and improve a mute effect of the water lamp handicraft.

In addition, due to various forms of water lamp handicrafts, the airtight spaces have different sizes. Therefore, to enable the water stirring impeller 300 to stir water in airtight spaces of different sizes, the water stirring impeller 300 in this embodiment includes a main body 320 and an impeller sleeve 330. The main body 320 has a magnetic member inside, and the connecting groove 310 is located at both ends of the main body 320. The impeller sleeve 330 is sleeved on the main body 320. In order to stir water in an airtight space of a different size, it is only necessary to remove the impeller sleeve 330 from the main body 320 and use an impeller sleeve 330 of a different size, so that the impeller sleeve 330 can stir water in the airtight space of a different size, thereby ensuring a water stirring effect of the water stirring impeller 300 and improving adaptability of the water stirring impeller 300.

The foregoing displays and describes basic principles and main features of the present invention and advantages of the present invention. Any person skilled in the art can smoothly implement the present invention according to the accompanying drawings of the specification and the foregoing descriptions. However, all equivalent variations of alterations, modifications, and evolutions made by those skilled in the art without departing from the scope of the technical solution of the present invention and using the technical content disclosed above are equivalent embodiments of the present invention. In addition, any alteration, modification, and evolution of any equivalent variation made to the above embodiments based on the substantive technology of the present invention still fall within the protection scope of the technical solution of the present invention.

What is claimed is:

1. A rotating mechanism of a handicraft, comprising:
- a cover body for covering a water lamp handicraft;
- a support member, wherein an end is connected to the cover body, and an other end comprises an outer rotating groove;
- a water stirring impeller, located between the cover body and the support member;
- a rotating body, sleeved on the support member and having an inner rotating groove corresponding to the outer rotating groove; and
- a ball ring, located between the outer rotating groove and the inner rotating groove, wherein the rotating body is rotatably connected to the support member through the ball ring.

2. The rotating mechanism of a handicraft according to claim 1, further comprising a fixed platform, wherein the fixed platform is connected to the support member.

3. The rotating mechanism of a handicraft according to claim 2, wherein a mounting column is arranged at a middle portion of the end of the support member comprising the outer rotating groove, the fixed platform comprises a mounting groove, and the mounting column is inserted in the mounting groove and is locked by a locking member, enabling the fixed platform to be fixedly connected to the support member.

4. The rotating mechanism of a handicraft according to claim 1, wherein an outer side of the rotating body has a rotating platform, and a plurality of blades is uniformly distributed on the rotating platform.

5. The rotating mechanism of a handicraft according to claim 4, wherein the rotating platform comprises a plurality of mounting holes.

6. The rotating mechanism of a handicraft according to claim 1, wherein a plurality of fixing columns is arranged on the cover body, the support member comprises fixing grooves corresponding to the fixing columns, and the fixing columns are inserted into the fixing columns to enable the support member to be connected to the cover body.

7. The rotating mechanism of a handicraft according to claim 1, wherein a connecting column is arranged on opposite surfaces of the cover body and the support member, both ends of the water stirring impeller comprise a connecting groove, and the connecting columns of the cover body and the support member are respectively inserted into the connecting grooves at the both ends of the water stirring impeller.

8. The rotating mechanism of a handicraft according to claim 7, wherein the water stirring impeller comprises a main body and an impeller sleeve, the main body has a magnetic member inside, the connecting grooves are located at both ends of the main body, and the impeller sleeve is sleeved on the main body.

9. The rotating mechanism of a handicraft according to claim 7, wherein the connecting column is made of a soft rubber material.

* * * * *